United States Patent
Poehlman et al.

(10) Patent No.: US 6,595,176 B2
(45) Date of Patent: Jul. 22, 2003

(54) ENGINE STARTING AND STOPPING DEVICE

(75) Inventors: Art Poehlman, West Bend, WI (US); Gary J. Gracyalny, Milwaukee, WI (US); Robert K. Mitchell, Brookfield, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 12 days.

(21) Appl. No.: 09/940,031

(22) Filed: Aug. 27, 2001

(65) Prior Publication Data

US 2002/0023607 A1 Feb. 28, 2002

Related U.S. Application Data

(63) Continuation-in-part of application No. 09/709,859, filed on Nov. 10, 2000, now Pat. No. 6,386,169, which is a continuation of application No. 09/183,425, filed on Oct. 30, 1998, now Pat. No. 6,230,678.

(51) Int. Cl.[7] ................................................. F02N 1/00
(52) U.S. Cl. ............................... 123/185.14; 123/185.3
(58) Field of Search .................... 123/185.14, 185.3, 123/185.2; 185/37, 39, 41 A; 74/6, 7 C; 56/10.5, 11.3, 13.8, 11.8, 13.4; 192/224.1

(56) References Cited

U.S. PATENT DOCUMENTS

| | | | |
|---|---|---|---|
| 927,681 A | * | 7/1909 | Rozier et al. ............ 123/149 B |
| 932,735 A | | 8/1909 | Willard |

(List continued on next page.)

FOREIGN PATENT DOCUMENTS

| | | |
|---|---|---|
| FR | 2639677 | 6/1990 |
| GB | 676850 | 8/1952 |
| JP | 62-53703 | 3/1983 |
| JP | 58051271 | 3/1983 |
| WO | WO 98/57062 | 12/1998 |
| WO | WO 00/26531 | 5/2000 |

OTHER PUBLICATIONS

16 CFR Sec. 1205.1–1205.36, see specifically 16 CFR 1205(a) and (c), published prior to Oct. 30, 1997 by the Office of the Federal Register National Archives and Records Administration, United States of America.

Primary Examiner—Mahmoud Gimie
(74) Attorney, Agent, or Firm—Michael Best & Friedrich LLP

(57) ABSTRACT

An engine starting and stopping device includes a first roller selectively abutting the flywheel of an engine for rotation on a first shaft in response to rotation of the flywheel. A second roller abuts the first roller and rotates in response to rotation of the first roller. A second shaft and an overwind clutch couple the second roller with a third roller such that the third roller rotates in response to rotation of the second roller. The third roller abuts a spring housing and causes rotation of the spring housing in response to rotation of the third roller. A spring is housed within the spring housing and is loaded in response to rotation of the spring housing. The overwind clutch slips when the spring is loaded to a preselected level to protect the spring from overwinding. The spring is selectively unloaded to rotate the spring housing in an unloading direction. Rotation of the spring housing in the unloading direction causes rotation of the engine's crankshaft and startup of the engine.

27 Claims, 4 Drawing Sheets

U.S. PATENT DOCUMENTS

| | | | |
|---|---|---|---|
| 950,848 A | 3/1910 | Gardner | |
| 1,009,503 A | 11/1911 | Goodhart | |
| 1,022,087 A | 4/1912 | Jenney | |
| 1,066,868 A | * 7/1913 | Wadewitz | 185/41 R |
| 1,097,899 A | 5/1914 | Volkmar | |
| 1,099,685 A | 6/1914 | Bennett | |
| 1,137,358 A | 4/1915 | Sinclair | |
| 1,394,619 A | 10/1921 | Hanson | |
| 1,936,554 A | 11/1933 | Lansing | |
| 2,293,322 A | 8/1942 | Veach | |
| 2,922,411 A | 1/1960 | Skinner | |
| 2,999,489 A | 9/1961 | Coughlin et al. | |
| 3,010,443 A | * 11/1961 | Lyvers | 123/185.14 |
| 3,139,877 A | 7/1964 | Graybill | |
| 3,151,605 A | 10/1964 | Tillotson et al. | |
| 3,165,100 A | 1/1965 | Svendsen | |
| 3,290,871 A | 12/1966 | Haas | |
| 3,301,243 A | 1/1967 | Lyvers | |
| 3,324,842 A | 6/1967 | Haas | |
| 3,375,814 A | 4/1968 | Hamman | |
| 3,395,687 A | 8/1968 | Harkness | |
| 3,447,523 A | 6/1969 | Bradbury et al. | |
| 3,692,010 A | 9/1972 | Dooley et al. | |
| 3,853,109 A | 12/1974 | Dooley | |
| 3,861,374 A | * 1/1975 | Dooley et al. | 123/185.14 |
| 3,960,246 A | 6/1976 | Fisher | |
| 4,067,243 A | 1/1978 | Kurata et al. | |
| 4,104,927 A | 8/1978 | Jensen et al. | |
| 4,176,648 A | 12/1979 | Gotoh et al. | |
| 4,230,084 A | 10/1980 | Gotoh et al. | |
| 4,363,298 A | 12/1982 | Kuhn | |
| 4,441,466 A | 4/1984 | Tangorra | |
| 5,086,890 A | 2/1992 | Turczyn et al. | |
| 5,186,134 A | 2/1993 | Morishima et al. | |
| 5,431,135 A | 7/1995 | Tyler | |
| 5,537,966 A | 7/1996 | Ohnishi | |
| 5,596,902 A | 1/1997 | McMillen | |
| 5,970,940 A | 10/1999 | Penton | |
| 6,230,678 B1 | 5/2001 | Gracyalny et al. | |

* cited by examiner

ENGINE STARTING AND STOPPING DEVICE

This application is a continuation-in-part of U.S. application Ser. No. 09/709,859 filed Nov. 10, 2000, now U.S. Pat. No. 6,386,169, which is a continuation of U.S. application Ser. No. 09/183,425 filed Oct. 30, 1998, now U.S. Pat. No. 6,230,678. The entire contents of both prior applications are incorporated herein by reference.

BACKGROUND

The invention relates to a starting and stopping device for an internal combustion engine. More specifically, the present invention relates to a mechanism for starting the engine by unloading stored power in an elastic member.

SUMMARY

The present invention provides a starting device for use on an internal combustion engine that includes an engine housing, a crankshaft mounted for rotation within the engine housing, and a flywheel mounted to the crankshaft for rotation therewith. The starting device includes a rotatable spring housing. An energy storing mechanism, including at least one elastic member, is housed within the spring housing. The elastic member is loaded in response to the spring housing rotating in a loading direction, and the spring housing rotates in an unloading direction in response to unloading of the elastic member.

A movable bracket is mounted to the engine housing. First, second, and third rollers are supported for rotation. At least one of the rollers is supported by the movable bracket.

An actuation assembly selectively moves the movable bracket between an engaged position and a disengaged position. When the bracket is in the engaged position, rotation of the flywheel is converted through the rollers into rotation of the spring housing in the loading direction. However, when the bracket is in the disengaged position, rotation of the flywheel is not converted into rotation of the spring housing.

To cause startup of the engine, a coupling mechanism couples the spring housing with at least one of the flywheel and the crankshaft in response to the spring housing rotating in the unloading direction.

A ratchet wheel is preferably mounted to the spring housing for rotation therewith, and a pawl is preferably mounted to the movable bracket to engage the ratchet wheel and to resist rotation of the spring housing in the unloading direction. The pawl is removable from engagement with the ratchet wheel upon pivoting or otherwise moving the bracket to the disengaged position, thereby permitting the elastic member to unload.

Other features and advantages of the invention will become apparent to those skilled in the art upon review of the following detailed description, claims, and drawings.

Figure 1:
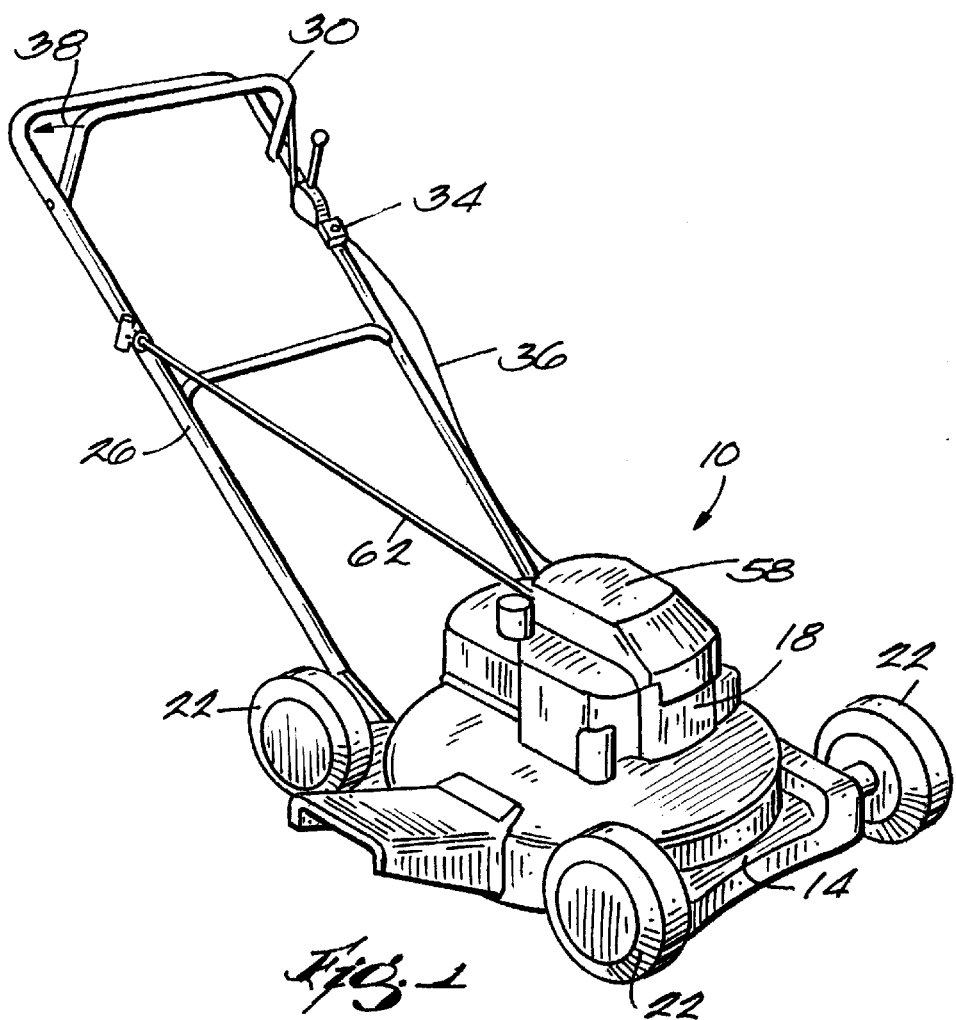
FIG. 1 is a perspective view of a lawnmower embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

FIG. 1 illustrates a lawnmower 10 comprising a deck 14, a blower housing or stationary housing 18, an engine 20 (FIG. 2) mounted to the deck 14 and supporting the stationary housing 18, a set of wheels 22 supporting the deck 14 above the ground, and a handle assembly 26 extending up from the deck 14. The lawnmower 10 also includes first and second manual actuators, which are a bail handle 30 and push button 34 in the illustrated embodiment, supported on the handle 26 at a location remote from the engine 20. The bail handle 30, or alternatively the push button 34, is operatively interconnected with mechanisms in the engine 20 by way of a cable. 36. As will be described below in more detail, the bail handle 30 and push button 34 must both be actuated in order to start up the engine 20. The bail handle 30, push button 34, and cable 36 are part of the control system of the engine 20. Alternatively, other types of manual actuators may be used, such as levers, knobs, removable keys, etc.

It should be noted that although the invention is illustrated as embodied in a lawnmower 10, the invention may be embodied in other devices powered by either a four-stroke or two-stroke cycle internal combustion engine. In some applications it may be desirable to have a two-step engine starting sequence. In other applications, it may be that only a single manual actuator, such as a push button or bail handle, is actuated to start the engine 20.

During operation of the lawnmower 10, the bail handle 30 must be moved to a start position 38 (FIG. 1) near the end of the handle assembly 26 to keep the engine 20 operating. The bail handle 30 is biased to move to a rest position (see FIG. 1) once let go by the operator. This causes the ignition circuit of the engine 20 to be grounded and shutdown of the engine 20 to be initiated. In order to move the bail handle 30 to the start position 38, the push button 34 must first be depressed and held while the bail handle 30 is moved. Depressing the push button 34 disengages a lock on the bail handle 30 or on another movable member in the engine starting mechanism (discussed in further detail below) that is required to start the engine 20. Alternatively, the bail handle 30 and push button 34 may be configured such that the bail handle 30 must first be moved to the start position 38 to enable the push button 34 to be actuated, in which case actuation of the push button 34 starts the engine 20.

Figure 2:
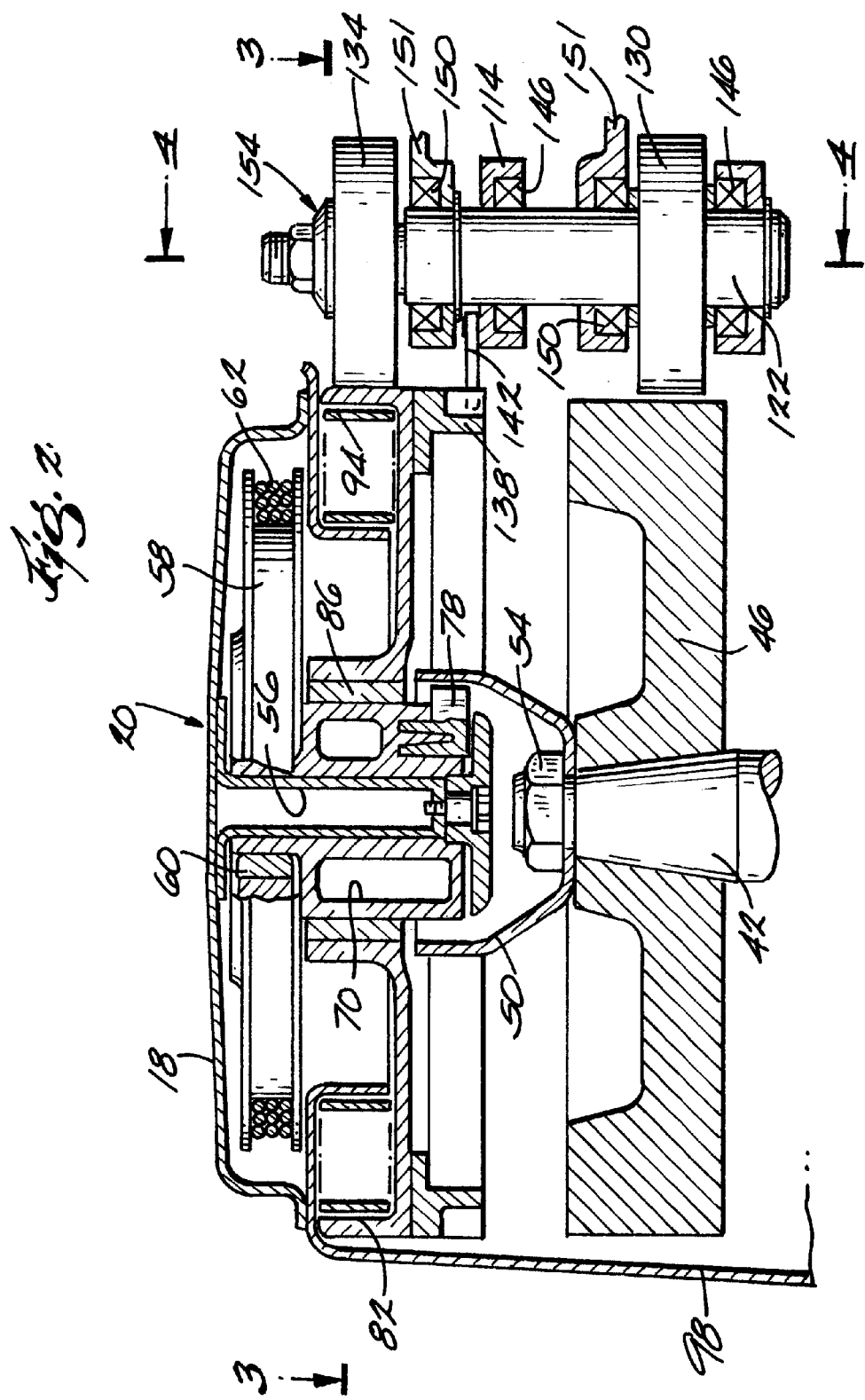
FIG. 2 is a cross-section view of a portion of the lawnmower illustrated in FIG. 1.

Turning now to FIG. 2, the engine 20 includes a crankshaft 42 that rotates in a known manner to drive a cutting blade positioned under the deck 14 of the lawnmower 10. The crankshaft 42 may be vertically-oriented as in the illustrated embodiment such that the cutting blade is attached directly to the lower end of the crankshaft 42. Alternatively, it can be oriented horizontally or non-vertically. Mounted to the top end of the crankshaft 42 are a flywheel 46 and a starter cup 50. A nut 54 may be threaded onto the end of the crankshaft 42 to secure the starter cup 50 and flywheel 46 to the top end of the crankshaft 42, as illustrated.

Figure 3:
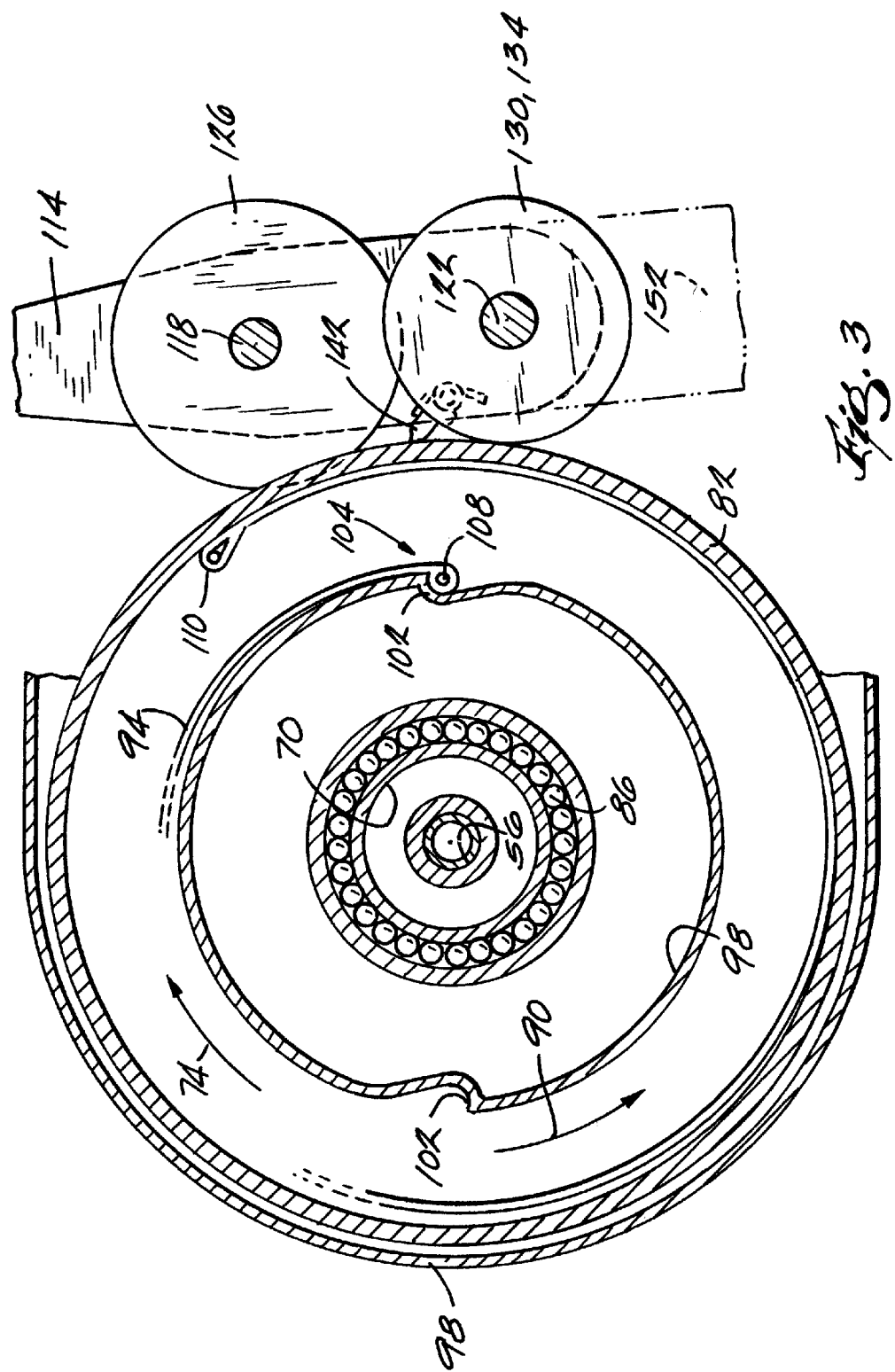
FIG. 3 is a view taken along line 3—3 in FIG. 2.

A shaft 56 is fixed to the stationary housing 18 (as by welding or integral forming), and extends down inside the housing 18. A recoil starter pulley 58 is rotatably mounted to the shaft 56 above the flywheel 46, crankshaft 42, and starter cup 50 by way of a one-way clutch 60. A starter pull rope 62 is wound around the starter pulley 58. The one-way clutch 60 couples the starter pulley 58 with an arbor 70, such that pulling the starter rope 62 rotates the starter pulley 58 and the arbor 70 in a starting direction 74 (FIG. 3).

A plurality of dogs 78 are pivotably mounted to the lower end of the arbor 70 and engage the starter cup 50 upon rotation of the arbor 70 in the starting direction 74 to thereby couple the recoil pulley 58 and crankshaft 42 for rotation together. The dogs 78 and cup 50 are therefore part of a centrifugal coupling mechanism between the arbor 70 and the crankshaft 42. Alternatively, the dogs 78 may be mounted to the starter cup 50, and may be spring-biased toward engagement with the arbor 70. Under such an arrangement, the dogs 78 would retract against the bias of the springs to uncouple the recoil pulley 58 from the crankshaft 42 once the crankshaft 42 has reached a predetermined rotational speed.

The two-stroke or four-stroke cycle of the engine 20 is started in response to rotation of the crankshaft 42 and flywheel 46 in the starting direction 74, and the crankshaft 42 and flywheel 46 continue to rotate in the starting direction 74 during operation of the engine 20. A recoil spring is housed within the recoil pulley 58 to rewind the starter rope 62 onto the starter pulley 58 once the engine 20 is started.

Also mounted around the arbor 70 above the crankshaft 42 and flywheel 46 is a spring housing 82. A second unidirectional clutch 86 permits rotation of the spring housing 82 in a spring loading direction 90 (FIG. 3) with respect to the arbor 70, but couples the arbor 70 and spring housing 82 together for rotation in the starting direction 74. An elastic member or spring 94, which is a coil of spring steel in the illustrated embodiment, is housed within the spring housing 82. The spring housing 82 has an open top that is covered partially by a portion of an engine housing 98.

The portion of the engine housing 98 also extends down into the spring housing 82, and there defines two eyelets 102. The inner end 104 of the spring 94 describes a hook 108 that releasably interconnects with one of the eyelets 102. The outer end 110 of the spring 94 is mounted to the spring housing 82 with a bolt, hook, or the like. The spring 94 wraps around the inner portion of the engine housing 98 and is loaded in response to the spring housing 82 rotating in the loading direction 90.

The spring housing 82 rotates with respect to the engine housing 98 in the starting direction 74 in response to unloading of the spring 94. The rewind pulley 58 does not rotate when the spring 94 is unloading, because the unidirectional clutch 60 does not couple the arbor 70 and the rewind pulley 58 for rotation together when the arbor 70 rotates in the starting direction 74. Because the second unidirectional clutch 86 transforms rotation of the spring housing 82 in the starting direction 74 into rotation of the arbor 70 in the same direction, the dogs 78 engage the starter cup 50 as described above. The engine 20 may, therefore, be started in response to the spring 94 becoming unloaded.

Figure 4:
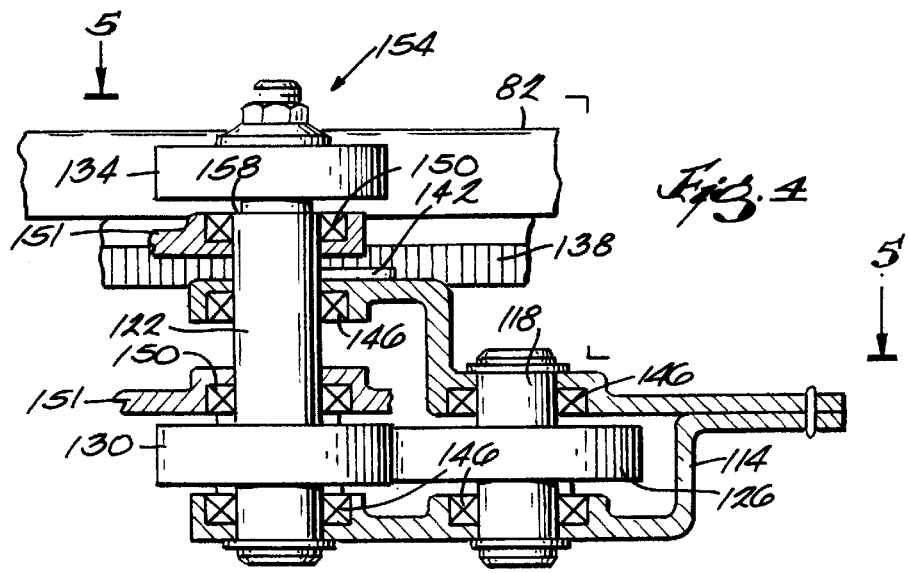
FIG. 4 is a view taken along line 4—4 in FIG. 2.

A spring loading mechanism is illustrated in FIGS. 2–4. The spring loading mechanism includes a bracket 114, first and second shafts 118, 122 mounted to the bracket 114, and first, second, and third rollers 126, 130, 134. As used herein, "rollers" means either the resilient (e.g., rubber) friction rollers illustrated or toothed members such as gears. Also included in the spring loading mechanism is a locking mechanism that includes a ratchet wheel 138 (FIGS. 2 and 4) mounted under the spring housing 82 and a pawl 142 mounted to the bracket 114 and in engagement with the ratchet wheel 138.

As seen in FIGS. 2 and 4, the first and second shafts 118, 122 are supported for rotation with respect to the bracket 114 by bearings or bushings 146. The first roller 126 is fixed to the first shaft 118, and the second roller 130 is fixed to the second shaft 122. Alternatively, the first shaft 118 may be fixed to the bracket 114 and the first roller 126 be rotatable about the first shaft 118. The second shaft 122 is supported by bearings or bushings 150 in support arms 151 that are mounted to the engine housing 98. The bracket 114 is therefore pivotable about the second shaft 122. The pivot axis for the bracket 114 is therefore coaxial or collinear with the axis of rotation of the second shaft 122 in the illustrated embodiment. In alternative embodiments, a pivot axis for the bracket 114 may be provided that is non-coaxial with respect to the axis of rotation of the second shaft 122 (e.g., as shown in phantom at 152 in FIG. 3). This would permit both rollers 126, 134 to disengage the flywheel 46 and spring housing 82.

The third roller 134 is coupled to the second shaft 122 by way of a friction clutch or overwind clutch 154, the significance of which will be discussed below. The overwind clutch 154 includes a nut threaded onto the second shaft 122 and a Belleville washer and a flat washer sandwiched between the nut and the third roller 134. A shoulder 158 (FIG. 4) may be provided on the second shaft 122 to provide a bearing surface against which the third roller 134 is pressed as the nut is tightened. Provided the friction limit in the overwind clutch 154 is not exceeded, the third roller 134 will rotate with the second shaft 122 in response to rotation of the second roller 130. The second shaft 122 may be termed a "coupling shaft."

It should be noted that the overwind clutch 154 could alternatively be used to couple the second roller 130 to the second shaft 122 or to couple the first roller 126 to the first shaft 118. The overwind clutch 154 will reduce the likelihood that the spring 94 will overwind, provided the overwind clutch 154 is operatively positioned substantially anywhere between the spring 94 and the crankshaft 42. Therefore, the specific position of the overwind clutch 154 illustrated should not be regarded as limiting.

Figure 5:
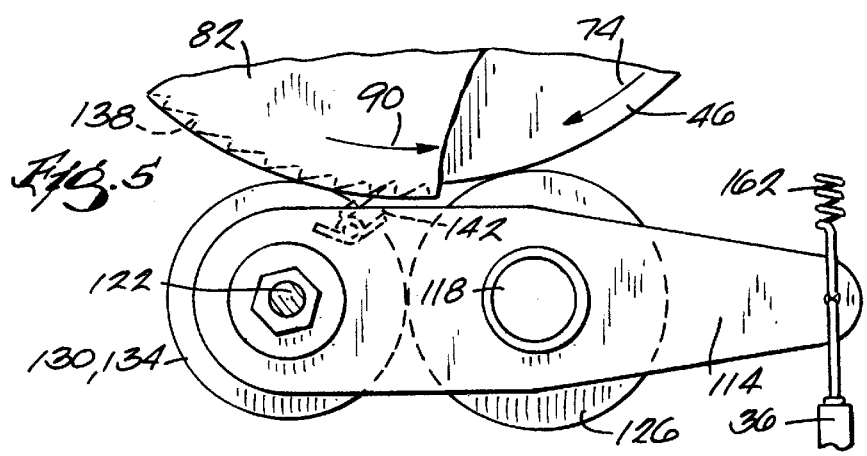
FIG. 5 is a view taken along line 5—5 in FIG. 4 showing the spring loading mechanism in an engaged position.
Figure 6:
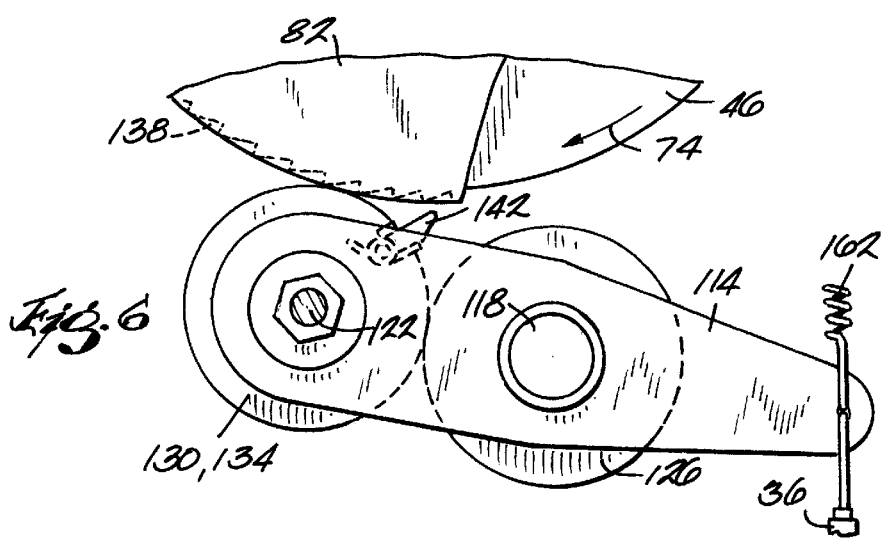
FIG. 6 is a view taken along line 5—5 in FIG. 4 showing the spring loading mechanism in a disengaged position.

Turning to FIGS. 5 and 6, the bracket 114 is pivotable between an engaged position (FIG. 5) and a disengaged position (FIG. 6). The third roller 134 is in contact with the spring housing 82 whether the bracket 114 is in the engaged or disengaged position. The cable 36 and a return spring 162 are interconnected to the end of the bracket 114 opposite the pivot axis. The bracket 114 may be pivoted to the disengaged position in response to actuation of one or both of the manual actuators 30, 34 through the cable 36.

During operation of the engine 20, the bail handle 30 is maintained in the start position 38, which holds the bracket 114 in the disengaged position. When the bail handle 30 is released, the first roller 126 is moved into engagement with the flywheel 46 under the influence of the return spring 162. As seen in FIG. 5, the coastdown rotation of the flywheel 46 in the starting direction 74 causes the first roller 126 to rotate in the opposite direction (counterclockwise in the illustrated embodiment), which causes the second and third rollers 130, 134 to rotate opposite (e.g., clockwise) the direction of rotation of the first roller 126.

The third roller 134, through its engagement with the spring housing 82, causes the spring housing 82 to rotate in the loading direction 90, which is opposite the starting direction 46 or counterclockwise. Rotation of the spring housing 82 in the loading direction 90 winds the spring 94 around the inner portion of the engine housing 98 and loads the spring 94. The pawl 142 engages the ratchet wheel 138 and prevents the spring 94 from unloading.

As the spring 94 winds tighter, the resistance is transmitted back through the third roller 134, overwind clutch 154, second shaft 122, second roller 130, and first roller 126 to the flywheel 46 and crankshaft 42. This has a braking effect on the flywheel 46 and crankshaft 42 and helps bring them to a stop. If the load in the spring 94 exceeds a predetermined amount, the torque transmitted from the second shaft 122 to the third roller 134 will become high enough to overcome the frictional forces in the overwind clutch 154, thereby decoupling the flywheel 46 and crankshaft 42 from the spring housing 82 and protecting the spring 94 from overwinding and potentially being damaged.

It should be noted that the arrangement of the flywheel 46, first roller 126, and second roller 130 causes the spring loading mechanism to be self-actuating. In other words, as the spring 94 tightens in the spring housing 82, the first roller 126 must transmit more and more torque to the second roller 130 to continue loading the spring 94. Because of the arrangement of parts, the first roller 126 will attempt to crawl in the counterclockwise direction (as seen in FIG. 5) around the second roller 130, which causes the first roller 126 to be pressed tighter and tighter against the flywheel 46. The resulting increase in normal force between the flywheel 46 and the first roller 126 permits the first roller 126 to transmit more torque to the spring housing 82 through the second roller 130, second shaft 122, and third roller 134 up to the point where the overwind clutch 154 slips or the flywheel 46 and crankshaft 42 rotation stops.

In light of the self-energizing nature of the spring loading mechanism, the return spring 162 only has to be strong enough to bring the first roller 126 into contact with the flywheel 46 with enough normal force to transmit the initial rotations to the spring housing 82. Once spring loading is initiated, the return spring 162 does not have to provide increasing normal force between the first roller 126 and the flywheel 46, as that is automatically accomplished with the self-energizing arrangement of parts described above.

It should also be noted that only one of the rollers 126, 130, 134 need be movable to engage and disengage one of the other rollers, the flywheel 46, or spring housing 82 to interengage and disengage the flywheel 46 and spring housing 82. In alternative embodiments, for example, the first roller 126 alone may be mounted to the movable bracket 114 and the second roller 130, second shaft 122, and third roller 134 may be supported independent of the bracket 114 at a fixed location. In other alternative embodiments, the first roller 126 could be rotatable mounted at a fixed location in engagement with the flywheel 46, and the second roller 130, second shaft 122, and third roller 134 may be carried by a movable bracket and movable into and out of engagement between the first roller 126 and the spring housing 82.

In still another alternative embodiment, the three rollers 126, 130, 134 may all be in fixed locations, with the first roller 126 engaging both the flywheel 46 and the second roller 130, and the third roller 134 engaging the spring housing 82. In such an alternative construction, the movable bracket 114 may engage and disengage a clutch that couples the second and third rollers 130, 134 for rotation together.

Startup of the engine 20 is accomplished by actuating the push button 34 and the bail handle 30 (or one or more other manual actuators). This causes the cable 36 to tighten and pivot the bracket 114 clockwise as seen in FIGS. 5 and 6. This removes the pawl 142 from the ratchet wheel 138 and permits the spring 94 to unload. The resulting rotation of the spring housing 82 in the starting direction 74 is transmitted to the flywheel 46 and crankshaft 42 through the arbor 70, dogs 78, and cup 50. The engine 20 is capable of sustaining rotation of the flywheel 46 and crankshaft 42 once the crankshaft 42 has started rotating.

The hook 108 on the inner end 104 of the spring 94 slides out of the eyelet 102 in the engine housing 98 once the spring 94 has substantially entirely unloaded. This prevents the spring 94 from bending back on itself at the inner end 104 and snapping. In this regard, the hook and eyelet 10, 102 arrangement is essentially a one-way clutch, and may be replaced with other suitable one-way clutches.

In an alternative embodiment, the bracket 114 may be pivoted by an automatic spring loading mechanism that pivots the rollers 126, 130, 134 into engagement with the flywheel 46 and spring housing 82 during operation of the engine 20 rather than during engine coastdown. The automatic spring loading mechanism would also remove the rollers 126, 130, 134 from engagement with one or both of the flywheel 46 and spring housing 82 once the spring 94 is sufficiently loaded. Also, the overwind clutch 154 would let the third roller 134 slip with respect to the second shaft 122 once the spring 94 is loaded to a selected amount.

While it is preferred that the first roller 126 include a resilient roller portion that is easily engageable and disengageable with the flywheel 46, the first roller 126 may also include a toothed portion (e.g., above or below the resilient roller portion). The second roller 130 may be a toothed member, such as a gear, that meshes with the toothed portion of the first roller 126. A ring gear may be mounted around the outside of the spring housing 82, or gear teeth otherwise may be provided on the outside of the spring housing 82. The third roller 134 may also be a toothed member that meshes with the gear teeth on the outside surface of the spring housing 82. The first, second, and third rollers 26, 30, 34 may therefore include different combinations of gears and resilient rollers than that shown in the accompanying drawings.

What is claimed is:
1. A starting device for use on an internal combustion engine that includes an engine housing, a crankshaft mounted for rotation within the engine housing, and a flywheel mounted to the crankshaft for rotation therewith, the starting device comprising:

a rotatable spring housing;

an energy storing mechanism including at least one elastic member housed within said spring housing, said elastic member being loaded in response to said spring housing rotating in a loading direction, and said spring housing rotating in an unloading direction in response to unloading of said elastic member;

a movable bracket;

first, second, and third rotatable rollers, at least one of said rollers being supported by said movable bracket;

an actuation assembly selectively moving said movable bracket between an engaged position and a disengaged position, rotation of the flywheel being converted through said rollers into rotation of said spring housing in said loading direction when said bracket is in said engaged position, and rotation of the flywheel not being converted into rotation of said spring housing when said bracket is in said disengaged position; and a coupling mechanism coupling said spring housing with at least one of the flywheel and the crankshaft in response to said spring housing rotating in said unloading direction, to cause startup of the engine.

2. The starting device of claim 1, wherein said first roller is supported by said movable bracket and is movable into engagement with the flywheel when said bracket is in said engaged position, said second roller rotating in response to rotation of said first roller, said third roller rotating in response to rotation of said second roller, and said third roller engaging said spring housing to cause rotation of said spring housing in said loading direction in response to rotation of said first and second rollers.

3. The starting device of claim 1, further comprising first and second shafts rotatably mounted to said bracket, wherein said first roller is mounted to said first shaft, and wherein said second and third rollers are mounted to said second shaft for rotation therewith, such that when said bracket is in said engaged position, said first roller engages the flywheel, said third roller engages the spring housing, and said second roller engages said first roller, whereby rotation of the flywheel causes rotation of said first roller, rotation of said first roller causes rotation of said second roller, rotation of said second roller causes rotation of said second shaft, rotation of said second shaft causes rotation of said third roller, and rotation of said third roller causes rotation of said spring housing in said loading direction.

4. The starting device of claim 3, wherein said bracket is pivotably mounted to said second shaft and pivotable between said engaged and disengaged positions, and wherein said first roller is disengaged from said flywheel when said bracket is pivoted to said disengaged position.

5. The starting device of claim 1, further comprising an overwind clutch operatively associated with one of said rollers to substantially prevent loading of said elastic member beyond a selected maximum load.

6. The starting device of claim 1, further comprising a locking mechanism including a ratchet wheel and a pawl, said ratchet wheel being mounted to said spring housing for rotation therewith and said pawl engaging said ratchet wheel to resist rotation of said spring housing in said unloading direction, said pawl being selectively removable from engagement with said ratchet wheel to permit unloading of said elastic member.

7. The starting device of claim 6, wherein said pawl is mounted to said bracket and wherein said pawl is removed from engagement with said ratchet wheel in response to movement of said bracket toward said disengaged position.

8. The starting device of claim 1, wherein at least one of said first, second, and third rollers is a gear.

9. The starting device of claim 1, further comprising a return spring biasing said bracket toward said engaged position such that said bracket is moved to said engaged position substantially simultaneously with initiation of engine shutdown, and such that said spring housing is rotated in said loading direction during engine coastdown, and such that loading of said elastic member has a braking effect on the flywheel and crankshaft.

10. The starting device of claim 1, wherein said first roller engages the flywheel when said bracket is in said engaged position, and wherein said actuation assembly is self energizing such that loading of said elastic member causes said first roller to more firmly engage the flywheel.

11. The starting device of claim 1, further comprising first and second manual actuators, at least one of said manual actuators being remotely disposed with respect to said engine, wherein both of said first and second manual actuators must be actuated to move said movable bracket to said disengaged position, and wherein at least one of said manual actuators must be actuated to move said movable bracket to said engaged position.

12. An internal combustion engine comprising:

a engine housing;

a crankshaft mounted for rotation within said engine housing;

a flywheel mounted to said crankshaft for rotation therewith;

a rotatable spring housing;

an energy storing mechanism including at least one elastic member housed within said spring housing, said elastic member being loaded in response to said spring housing rotating in a loading direction, and said spring housing rotating in an unloading direction in response to unloading of said elastic member;

a movable bracket;

first, second, and third rollers, at least one of said rollers being supported by said movable bracket;

an actuation assembly selectively moving said movable bracket between an engaged position and a disengaged position, rotation of said flywheel being converted into rotation of said spring housing in said loading direction through said rollers when said bracket is in said engaged position, and rotation of said flywheel not being converted into rotation of said spring housing when said bracket is in said disengaged position; and a coupling mechanism coupling said spring housing with at least one of said flywheel and said crankshaft in response to said spring housing rotating in said unloading direction to cause startup of said engine.

13. The engine of claim 12, wherein said movable bracket is pivotably mounted to said engine housing, and wherein said first roller is rotatably mounted to said support bracket and movable into and out of engagement with said flywheel in response to pivoting of said support bracket.

14. The engine of claim 12, further comprising a shaft rotatably mounted to said movable bracket, wherein said first roller is rotatably mounted to said movable bracket, wherein said second and third rollers are both coupled to said shaft for rotation therewith, wherein said first roller abuts said second roller to cause rotation of said second roller and said shaft in response to rotation of said first roller, and wherein said third roller rotates in response to rotation of said shaft.

15. The engine of claim 14, wherein said first roller engages said flywheel and said third roller engages said spring housing when said bracket is moved to said engaged position such that said spring housing is rotated in said loading direction in response to rotation of said flywheel.

16. The engine of claim 14, further comprising an overwind clutch mounted to said shaft and interposed between said third roller and said shaft to permit the transmittal of torque from said shaft to said third roller up to a threshold torque level at which said overwind clutch permits relative rotation between said shaft and said third roller.

17. The engine of claim 14, wherein said movable bracket is pivotably mounted about said shaft.

18. The engine of claim 12, further comprising a locking mechanism including a ratchet wheel mounted to said spring housing and a pawl removably engaged with said ratchet wheel to permit rotation of said spring housing in said loading direction and resist rotation of said spring housing in said unloading direction.

19. The engine of claim 18, wherein said pawl is supported by said movable bracket and is moved out of engagement with said ratchet wheel in response to movement of said movable bracket to said disengaged position.

20. The engine of claim 12, wherein at least one of said first, second, and third rollers is a gear.

21. The engine of claim 12, further comprising a return spring biasing said bracket toward said engaged position such that said bracket is moved to said engaged position substantially simultaneously with initiation of engine shutdown, and such that said spring housing is rotated in said loading direction during engine coastdown and has a braking effect on said flywheel and crankshaft.

22. The engine of claim 12, wherein said first roller engages said flywheel when said bracket is in said engaged position, and wherein said actuation assembly is self energizing such that loading of said elastic member causes said first roller to more firmly engage the flywheel.

23. A method for starting an internal combustion engine having an engine housing, a crankshaft mounted for rotation within the engine housing, and a flywheel mounted to the crankshaft for rotation therewith, the method comprising:

providing a rotatable spring housing;

movably supporting a bracket within the engine housing;

providing first, second, and third rollers;

rotatably mounting at least one of the rollers to the bracket;

selectively moving the bracket between an engaged position and a disengaged position, the first roller engaging the flywheel and the third roller engaging the spring housing when the bracket is in the engaged position, and at least one of the first roller and third roller disengaging a respective one of the flywheel and spring housing when the bracket is moved to the disengaged position;

coupling the second roller between the first and third rollers such that rotation of the first roller is converted into rotation of the third roller;

rotating the first, second, and third rollers in response to rotation of the flywheel when the bracket is in the engaged position;

rotating the spring housing in a loading direction in response to rotation of the third roller;

storing energy within an elastic member housed within the spring housing in response to rotation of the spring housing in the loading direction;

rotating the spring housing in an unloading direction in response to unloading of the elastic member; and coupling the crankshaft with the spring housing to convert rotation of the spring housing in the unloading direction into rotation of the crankshaft in a starting direction to start the engine.

24. The method of claim 23, further comprising locking the spring housing against rotation of the spring housing in the unloading direction, and selectively unlocking the spring housing to permit rotation in the unloading direction.

25. The method of claim 24, wherein said act of selectively unlocking includes mounting a ratchet wheel to the spring housing and supporting a pawl on the movable bracket such that the pawl engages the ratchet wheel when the bracket is in the engaged position, the pawl preventing the spring housing from rotating in the unloading direction when the pawl is engaged with the ratchet wheel; positioning at least one manual actuator remote from the engine; and actuating the manual actuator to move the movable bracket to the disengaged position to remove the pawl from engagement with the ratchet wheel.

26. The method of claim 25, wherein the act of positioning at least one manual actuator includes positioning first and second manual actuators such that at least one of the first and second manual actuators is remote from the engine, and wherein the act of actuating the manual actuator includes actuating both the first and second manual actuators.

27. The method of claim 23, wherein the act of rotatably mounting at least one of the rollers to the bracket includes rotatably mounting the first roller to the bracket, rotatably mounting a shaft to the bracket, coupling the second and third rollers to the shaft for rotation therewith, and interengaging the first and second rollers.

* * * * *